(12) United States Patent
Whiting

(10) Patent No.: US 12,474,504 B2
(45) Date of Patent: Nov. 18, 2025

(54) ROTATING RAIN GAUGE

(71) Applicant: Jeffrey Michael Whiting, Thompson's Station, TN (US)

(72) Inventor: Jeffrey Michael Whiting, Thompson's Station, TN (US)

( * ) Notice: Subject to any disclaimer, the term of this patent is extended or adjusted under 35 U.S.C. 154(b) by 285 days.

(21) Appl. No.: 18/338,949

(22) Filed: Jun. 21, 2023

(65) Prior Publication Data
US 2024/0427054 A1 Dec. 26, 2024

(51) Int. Cl.
G01W 1/14 (2006.01)
G01P 13/02 (2006.01)
G01W 1/04 (2006.01)

(52) U.S. Cl.
CPC ............... *G01W 1/14* (2013.01); *G01P 13/02* (2013.01); *G01W 1/04* (2013.01)

(58) Field of Classification Search
CPC ............ G01W 1/04; G01W 1/14; G01P 13/02
USPC ....................................... 73/170.16
See application file for complete search history.

(56) References Cited

U.S. PATENT DOCUMENTS

| 916,060 | A | 3/1909 | Thomson |
| 1,118,259 | A | 11/1914 | Beard |
| 2,384,954 | A | 9/1945 | Moore |
| 2,520,557 | A | 8/1950 | Moore |
| 3,826,135 | A | 7/1974 | Hollmann |
| 4,665,744 | A | 5/1987 | Smith |
| 4,836,018 | A | 6/1989 | Dispenza |
| 5,291,779 | A | 3/1994 | Govoni et al. |
| 5,421,198 | A | 6/1995 | More, III et al. |
| 5,531,114 | A | 7/1996 | Frager |
| 5,918,277 | A * | 6/1999 | Yilmaz ................... G01W 1/14 73/170.05 |
| 5,970,788 | A | 10/1999 | Kincheloe |
| 6,363,781 | B1 * | 4/2002 | Moore ..................... G01W 1/14 73/170.17 |
| 7,181,961 | B1 | 2/2007 | Hill |
| 2018/0341042 | A1 | 11/2018 | Soltani |
| 2023/0014089 | A1 | 1/2023 | Boissenin |

* cited by examiner

*Primary Examiner* — Nathaniel T Woodward
(74) *Attorney, Agent, or Firm* — Dunlap Bennett & Ludwig, PLLC

(57) ABSTRACT

A rain gauge is disclosed and includes a collection cylinder and a rain gauge head. The rain gauge head includes an intake opening and a vane tail, with the vane tail redirecting the intake opening to face oncoming wind and rain so that the intake opening collects oncoming rain. The rain gauge head includes a rainwater discharge to deposit rainwater within the collection cylinder. The rainwater discharge may be rotatably fastened to the collection cylinder so that the rain gauge head is free to rotate around a vertical axis for 360 degrees. Alternatively, the rain gauge head and collection cylinder may rotate in unison. An air exhaust port and air pressure relief valve may be formed in either of the rain head gauge or collection cylinder to release air trapped within the rain gauge. Airfoils may be placed on the collection cylinder to better redirect the rain gauge.

8 Claims, 5 Drawing Sheets

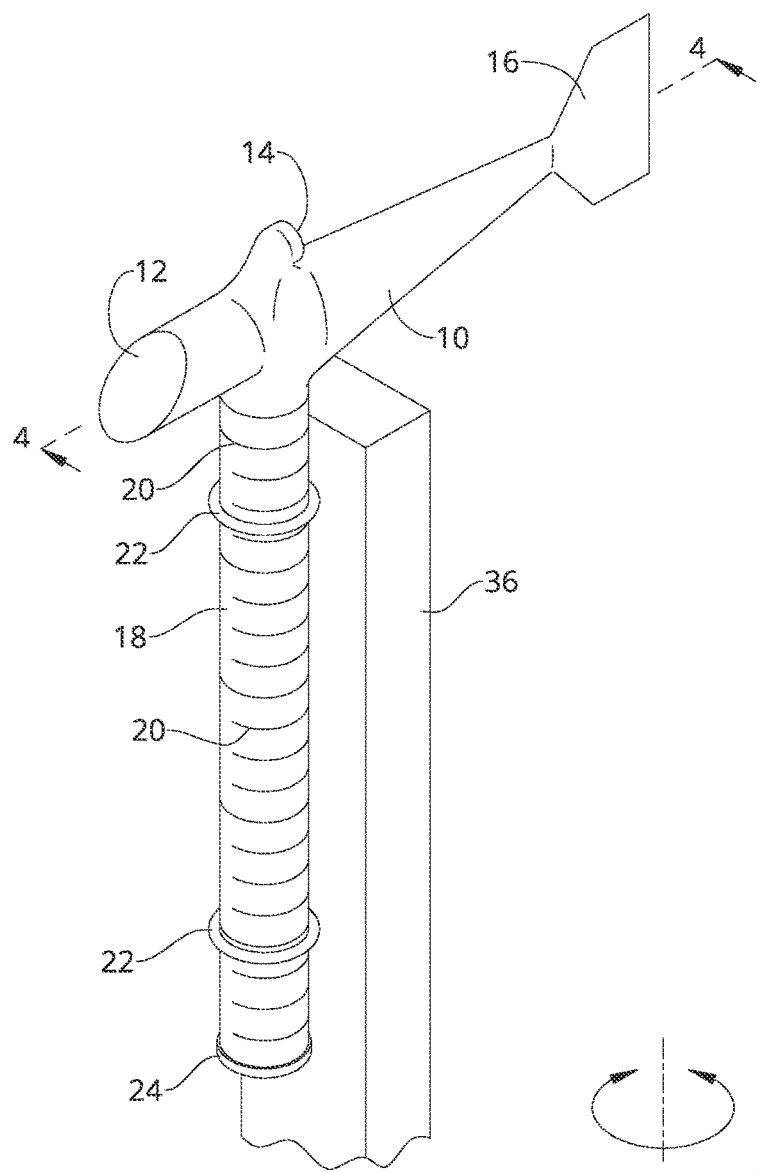
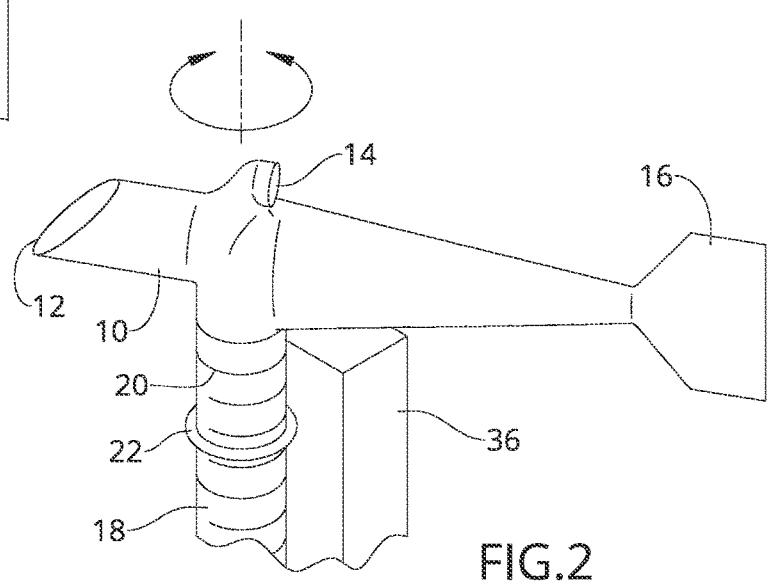
FIG.1
FIG.2

ROTATING RAIN GAUGE

BACKGROUND OF THE INVENTION

The present invention relates to weather measurement devices and, more particularly, to a rotating rain gauge.

Accurate measurement of weather phenomenon is crucial in the modern world. Accurate measurement allows for people to ultimately better determine the weather and climate for an area, as well as how that weather and climate is changing over time. This allows people, businesses and government to better plan for and deal with weather events. For example, accurate rainfall data is crucial for forecasters to give them a better understanding of ground saturation thereby allowing them to make more informed decisions when issuing flood watches & warnings. However, extreme weather creates a hostile environment and often prevents accurate weather condition measurements from being taken. One particularly troubled measurement area is rain measurement. During extreme weather events, e.g., hurricanes & severe thunderstorms, conventional rain gauges are ill-equipped to handle the extreme wind and changes in rainfall direction that result from the extreme weather. Conventional rain gauges simply provide a vertically facing opening that fails to capture rainwater blown horizontally by wind and often results in rainfall measurements that are less than what actually occurred.

As can be seen, there is a need for a rain gauge that captures rain in all conditions, including extreme weather events. The present invention solves this issue by providing a rain gauge that accurately measures rainfall in extreme high wind events and under normal conditions. The present invention provides a rain gauge that rotates 360 degrees around a vertical rain gauge axis and has an intake that collects rainfall that falls in both horizontal and vertical directions. The present invention further includes guiding elements that point the rain gauge intakes in the appropriate direction to maximize rain collection. The present invention is thus able to collect rain both vertically and horizontally across a full 360 degrees or horizontal directions, thereby ensuring accurate rain measurements during severe weather events.

SUMMARY OF THE INVENTION

In one aspect of the present invention, a rain gauge is provided. The rain gauge comprises a collection cylinder extending along a substantially vertical cylinder axis and having an open cylinder end and a closed cylinder end. The rain gauge further comprises a rain gauge head extending along a substantially horizontal head axis. The rain gauge head includes an intake opening at a first head end, a vane tail at an opposing second head end, and a rainwater discharge at a middle head portion, with the intake opening and vane tail being distal from the rainwater discharge. The rainwater discharge is rotatably coupled to the open cylinder end, such that the rain gauge head rotates about the cylinder axis.

In another aspect of the present invention the rainwater discharge includes at least one head bearing, and the open cylinder end includes at least one cylinder bearing, with the at least one head bearing coupled to the at least one cylinder bearing.

In another aspect of the invention the rain gauge head further includes an air exhaust port with an air pressure relief valve.

In another aspect of the present invention the rain gauge head includes a deflection shield proximal to the air exhaust port and air pressure relief valve, with the deflection shield configured to allow wind to pass through the air exhaust port and air pressure relieve valve while deflecting rainwater away from the air exhaust port and air pressure relief valve and towards the rainwater discharge.

In another aspect of the present invention the collection cylinder attaches to a holder comprising a holder base and at least one holder ring, wherein the holder base holds the closed cylinder end and the at least one holder ring holds a middle cylinder portion of the collection cylinder, with the holder base and at least one holder ring are coupled to a holder spine.

In another aspect of the present invention, a rain gauge is provided. The rain gauge comprises a collection cylinder extending along a substantially vertical cylinder axis and having an open cylinder end and a closed cylinder end. The rain gauge further includes a rain gauge head extending along a substantially horizontal head axis. The rain gauge head has an intake opening at a first head end, a vane tail at an opposing second head end, and a rainwater discharge at a middle head portion, with the intake opening and vane tail being distal from the rainwater discharge. The rainwater discharge is coupled to the open cylinder end, and the collection cylinder is rotatably coupled to a rain gauge holder, such that the collection cylinder and rain gauge head rotate about the cylinder axis.

In another aspect of the present invention, the rain gauge holder includes at least one upper holder and at least one lower holder, with the at least one upper holder including an upper holder bearing rotatably coupled to a middle portion of the collection cylinder and the at least one lower holder including a lower holder bearing rotatably coupled to the collection cylinder proximal to the closed cylinder end.

In another aspect of the present invention, the collection cylinder includes at least one airfoil extending in a same direction as the vane tail.

In another aspect of the present invention, the at least one airfoil includes an air exhaust port with an air pressure relief valve, the air exhaust port and air pressure relief valve extending through the at least one airfoil and into the collection cylinder.

In another aspect of the present invention, the collection cylinder includes a deflection shield proximal to the air exhaust port and air pressure relief valve, with the deflection shield configured to allow wind to pass through the air exhaust port and air pressure relieve valve while deflecting rainwater away from the air exhaust port and air pressure relief valve.

These and other features, aspects and advantages of the present invention will become better understood with reference to the following drawings, description, and claims.

BRIEF DESCRIPTION OF THE DRAWINGS

FIG. 1 shows a perspective view of an embodiment of a rain gauge in accordance with the present invention;

FIG. 2 shows another perspective view thereof, depicting the rotation of a rain gauge head;

DETAILED DESCRIPTION OF THE INVENTION

Figure 3:
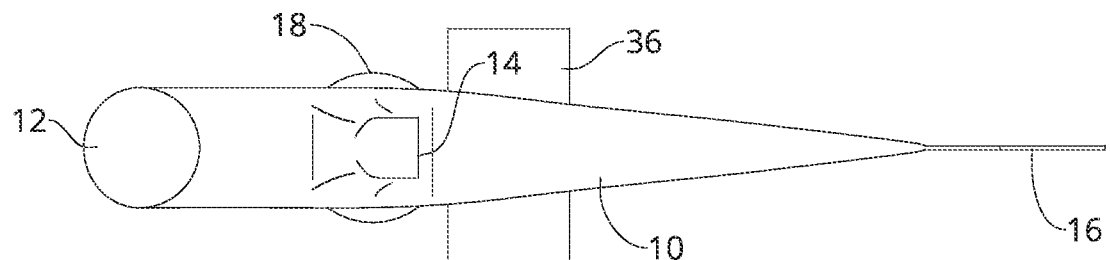
FIG. 3 shows a top view thereof.
Figure 4:
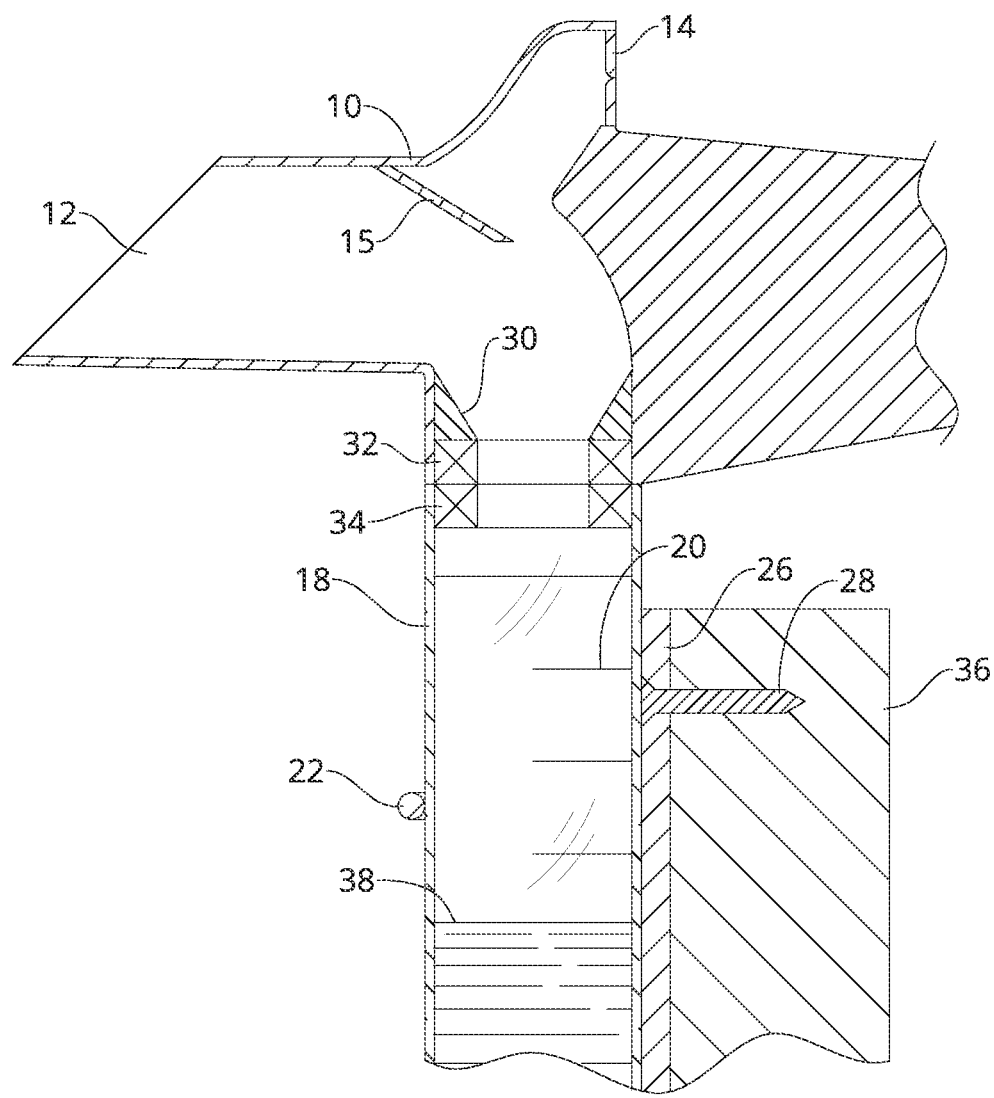
FIG. 4 shows a cross-sectional view thereof, taken along line 4-4 in FIG. 1.
Figure 5:
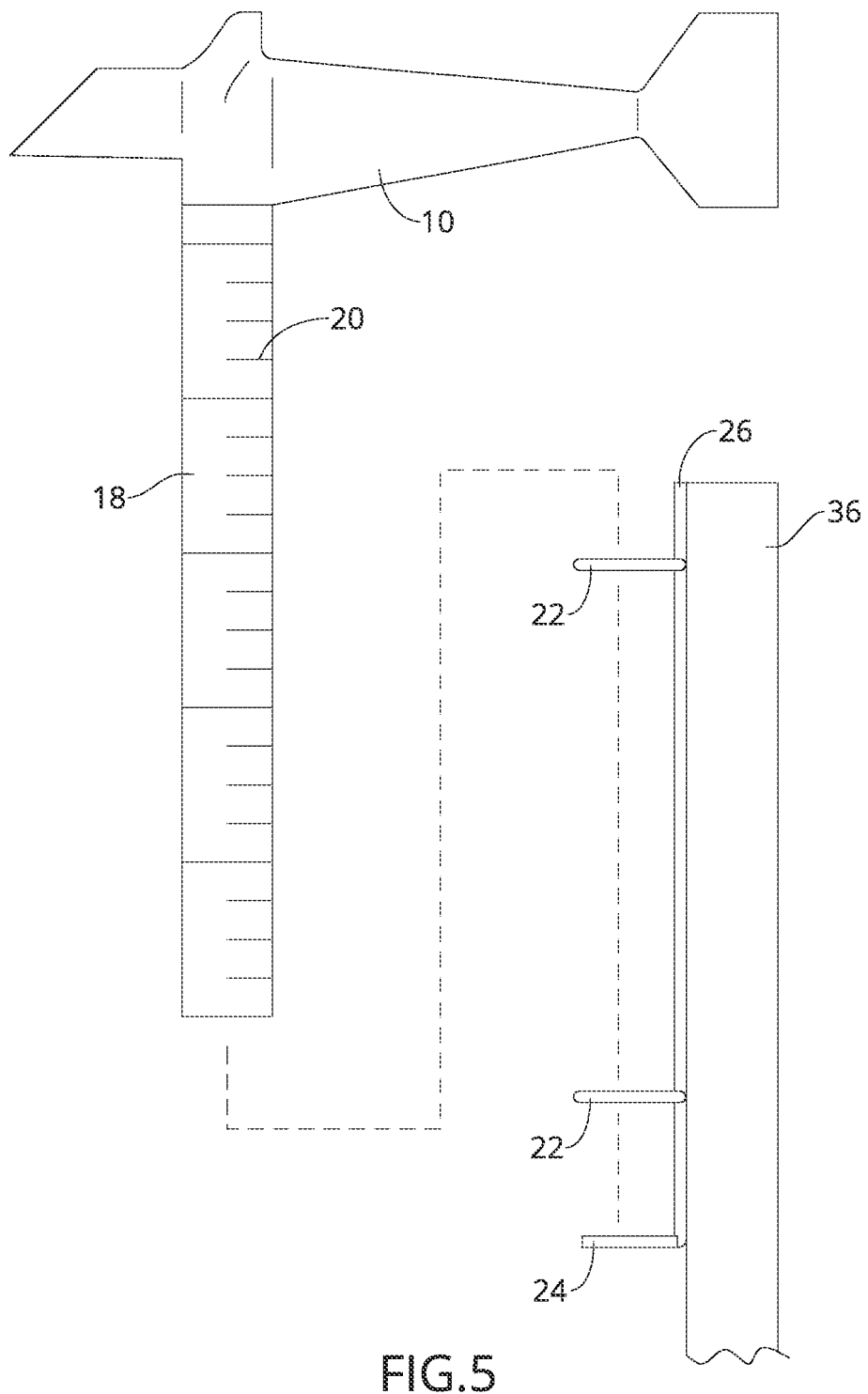
FIG. 5 shows an exploded view thereof.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, one embodiment of the present invention is a rain gauge that is rotatable about a substantially vertical axis. The rain gauge includes a rain gauge head and a collection cylinder, wherein the rain gauge head may rotate relative to the collection cylinder or the rain gauge head and collection cylinder may rotate in unison about the substantially vertical axis.

The rain gauge head may further extend substantially horizontally between a first head end and a second head end. The first head end includes an intake opening, and the second head end includes a vane tail. In the middle portion of the rain gauge head, a rain water discharge is included, with the rain water discharge connected to the intake opening such that rain water and air may pass through the intake opening and out of the rainwater discharge. The collection cylinder includes an open cylinder end and a closed cylinder end. The open cylinder end may be rigidly or rotatably coupled to the rainwater discharge such that rainwater may pass into the collection cylinder.

The rain gauge head may include an air exhaust port and air pressure relief valve and deflection shield. The deflection shield may be placed proximally to an entry for the air exhaust port and air pressure relief valve within the rain gauge head so that rainwater is deflected away from the air exhaust port and air pressure relief valve and through the rainwater discharge while allowing air to pass through the air exhaust port and air pressure relief valve. The air exhaust port and air pressure relief valve may be included on any suitable side or portion of the rain gauge head, e.g., a top middle portion of the rain gauge head.

Alternatively, the collection cylinder may include an air exhaust port and air pressure relief valve and deflection shield. The collection cylinder may further include at least one airfoil that extends away from the collection cylinder with the air exhaust port and air pressure relief valve extending through to a distal end of the airfoil relative to the collection cylinder. The deflection shield may be placed proximally to an entry for the air exhaust port and air pressure relief valve within the collection cylinder so that rainwater is deflected away from the air exhaust port and air pressure relief valve and through the rainwater discharge while allowing air to pass through the air exhaust port and air pressure relief valve.

Additionally, the rain gauge may include a holder that is configured to couple to a support, e.g., a post, to hold the rain gauge in place. The holder may include a holder spine coupled to a holder base and at least one holder ring. The holder base supports the closed cylinder end of the collection cylinder, and the at least one holder ring supports middle portions of the collection cylinder. Alternatively, the holder may include a holder spine integrally formed with an upper holder arm and a lower holder arm. The upper holder arm includes an upper holder bearing that rotatably couples to a middle portion of the collection cylinder and the lower holder bearing rotatably couples to the collection cylinder proximal to the closed cylinder end.

The present invention is thus able to provide a rain gauge that can collect rain in both vertical and horizontal directions, across 360 degrees of horizontal directions, in severe weather events. The present invention is thus able to accurately measure rainfall in all conditions, enabling better measurements and data collection for future weather and climate forecasts. Further, the present is formed and constructed such that it prevents or minimizes wind deformation on the rain gauge and rain falling into or around the rain gauge, thereby increasing the accuracy of the rainfall measurements taken by the present invention.

It should be noted that the materials of manufacture for the present invention are not particularly limited. For example, the example the rain gauge head and collection cylinder may be made of hard durable materials, such as plastics or metals.

Referring to FIGS. 1-5, a first embodiment of a rain gauge in accordance with the present invention is depicted. The rain gauge includes a rain gauge head 10 having an intake opening 12 at a first head end and a vane tail 16 at a second end. The rain gauge head 10 is arranged to extend along a substantially horizontal head axis. The intake opening 12 is formed to be elliptical with a diagonally arranged opening such that rainfall may enter the intake opening 12 from both horizontal and vertical directions. The vane tail 16 is formed to catch wind and redirect the intake opening 12 so that the intake opening 12 faces oncoming wind and rain to better collect rainwater. The rain gauge head 10 may further include an air exhaust port and air pressure relief valve 14 formed on a top side of a middle portion of the rain gauge head 10.

The rain gauge head 10 further includes a passageway that fluidly connects the intake opening 12 and a rainwater discharge in a middle portion of the rain gauge head 10, such that air and rainwater may flow through and between the intake opening 12 and the rainwater discharge. The air exhaust port and air pressure relief valve 14 is fluidly coupled to the passageway to allow air to pass through the air exhaust port and air pressure relief valve 14 and out of the passageway. Additionally, a deflection shield 15 may be placed into the passageway proximal to an entrance to the air exhaust port and air pressure relief valve 14. The deflection shield 15 thus is able to deflect rainwater toward the collection cylinder 18 while allowing air to pass around the deflection shield 15 and through the air exhaust port and air pressure relief valve 14.

A collection cylinder 18 extending along a substantially vertical cylinder axis includes an open cylinder end and a closed cylinder end. The rainwater discharge of the rain gauge head 10 is rotatably coupled to the open cylinder end of the collection cylinder 18 via at least one bearing. For example, the at least one bearing may include at least one head bearing 32 within the rainwater discharge and at least one cylinder bearing 34 within the open cylinder end. The at least one head bearing 32 and at least one cylinder bearing 34 are securely coupled together such that the rain gauge head 10 rotates freely about the cylinder axis. Further, the rainwater discharge includes a funnel 30 placed adjacent the at least one head bearing 32 such that rainwater flows around the at least one head bearing 32 and at least one cylinder bearing 34 and into the collection cylinder 18. The collection cylinder further includes measurement indicia 20 along its length to ensure accurate measurement of collected rainwater 38 within the collection cylinder 18.

To hold the rain gauge in position, the rain gauge may be coupled to a support 36, e.g., a post. The rain gauge is coupled to the support 36 via a holder formed from a holder spine 26, a holder base 24, and at least one holder ring 22. The holder spine 26 extends between the holder base 24 and an uppermost one of the at least one holder ring 22. The holder base 24 is formed to cooperate with and hold the closed cylinder end of the collection cylinder 18. The at least one holder ring 22 is formed to snugly fit around a middle portion of the collection cylinder 18, while still allowing the collection cylinder 18 to be slid into or out of the at least one holder ring 22. The holder spine 26 is securely fastened to the support 36 via known means, such as screws 28. When properly positioned, the collection cylinder 18 is held proximal to support 36 while the rain gauge head 10 rests above the support 26 and is able to freely rotate through a full 360 degrees about the cylinder axis.

Figure 6:
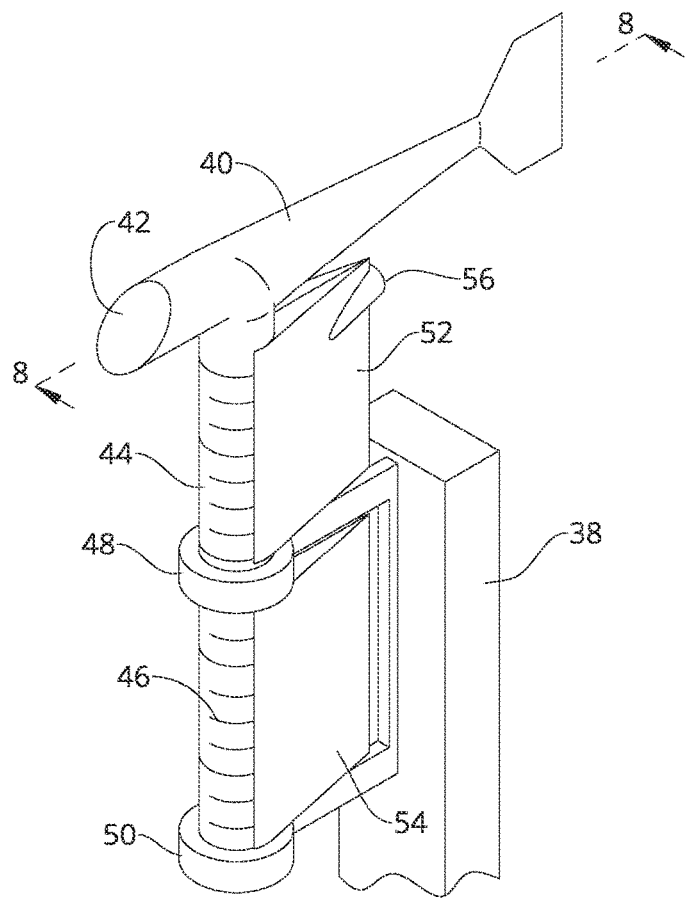
FIG. 6 shows a perspective of an alternate embodiment of a rain gauge in accordance with the present invention.
Figure 7:
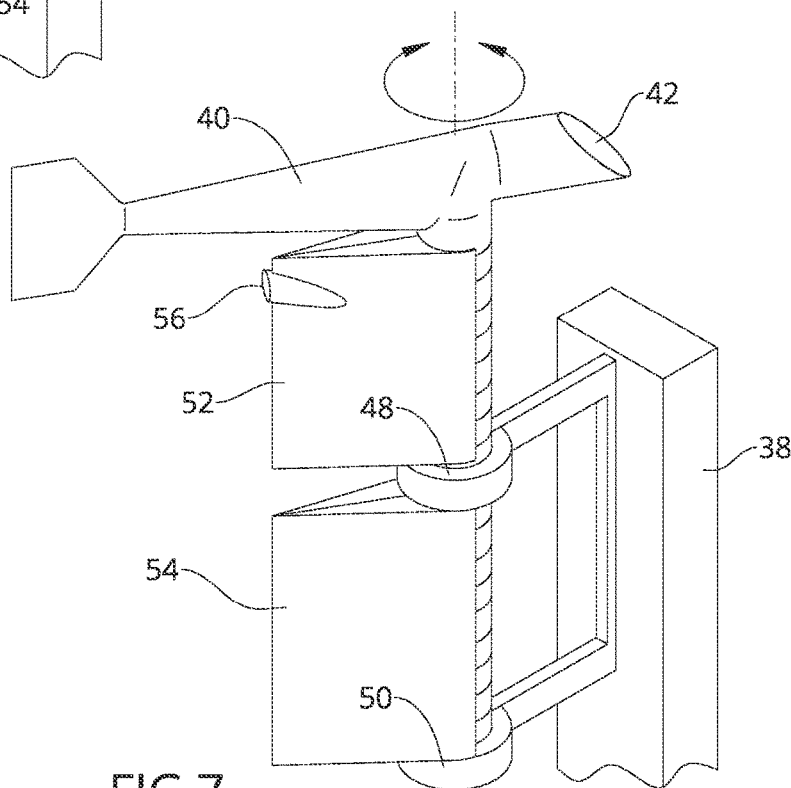
FIG. 7 shows another perspective thereof, depicting the rotation of a rain gauge head.
Figure 8:
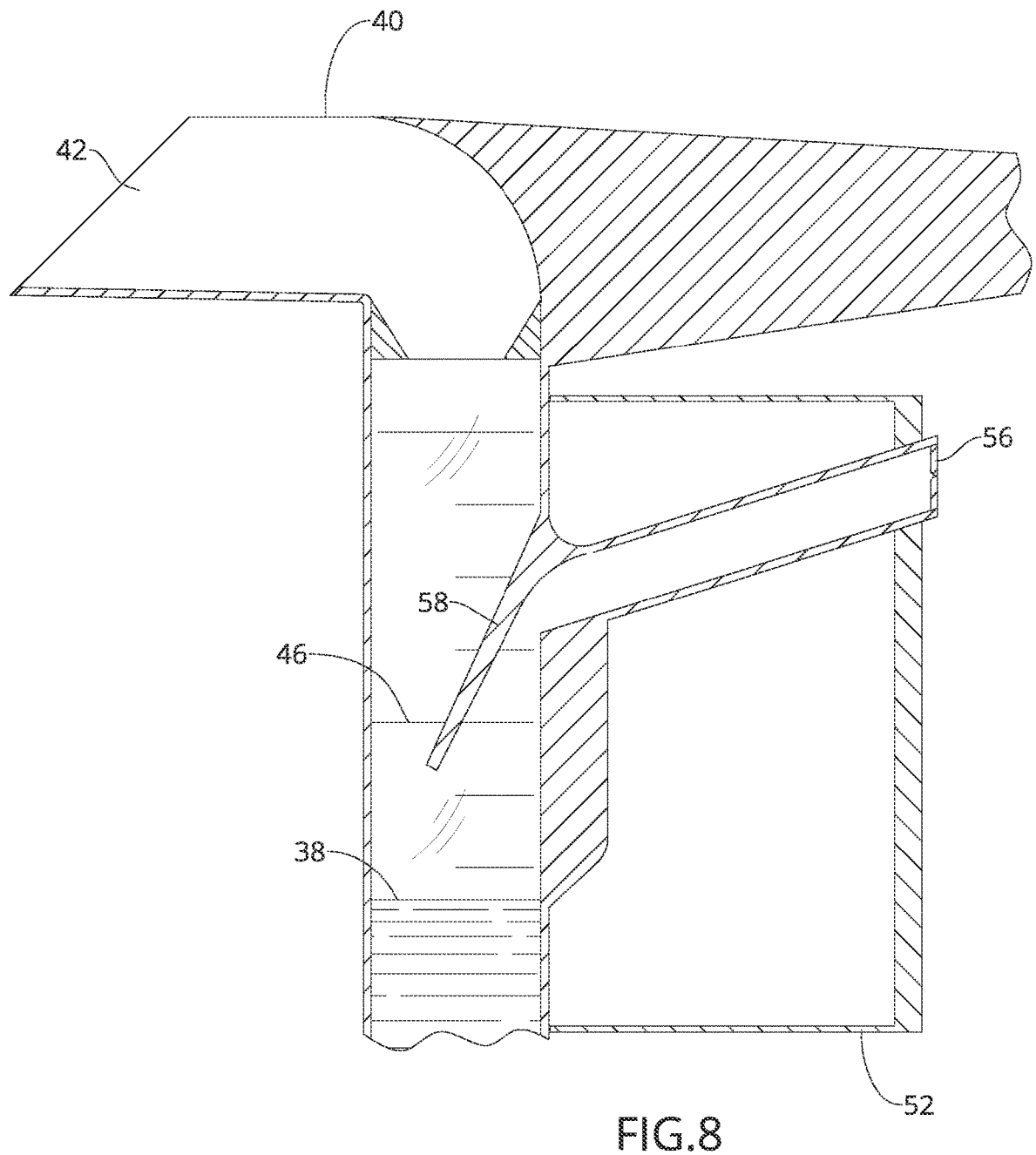
FIG. 8 shows a cross-sectional view thereof, taken along line 8-8 in FIG. 6.

Referring now to FIGS. 6-8, an alternate embodiment of a rain gauge in accordance with the present invention is shown. The rain gauge includes a rain gauge head 40 having an intake opening 42 at a first head end and a vane tail at a second end. The rain gauge head 40 is arranged to extend along a substantially horizontal head axis. The intake opening 42 is formed to be elliptical with a diagonally arranged opening such that rainfall may enter the intake opening 42 from both horizontal and vertical directions. The rain gauge head 40 further includes a passageway that fluidly connects the intake opening 42 and the rainwater discharge in a middle portion of the rain gauge head 40, such that air and rainwater may flow through and between the intake opening 42 and the rainwater discharge.

A collection cylinder 44 extending along a substantially vertical cylinder axis includes an open cylinder end and a closed cylinder end. The rainwater discharge of the rain gauge head 40 is rigidly coupled to the open cylinder end of the collection cylinder 44. A funnel may be included in the rainwater discharge to ensure rainwater enters the collection cylinder 44. Measurement indicia 46 are placed along the collection cylinder's 44 length to ensure accurate measurement of collected rainwater 38 within the collection cylinder 44. The collection cylinder 44 further includes an upper airfoil 52 and a lower airfoil 54, attached to and extending away from the collection cylinder in a same direction as the tail vane of the rain gauge head 40. The tail vane and upper and lower airfoils 52, 54 cooperate to redirect the rain gauge head 40 and collection cylinder 44 so that the intake opening 42 faces oncoming wind and rain to better collect rainwater.

Additionally, the collection cylinder 44 includes an air exhaust port and air pressure relief valve 56 that is fluidly coupled to the interior of the collection cylinder 44 so that air may pass through the air exhaust port and air pressure relief valve 56 and out of the collection cylinder 44. The air exhaust port and air pressure relief valve 56 extends away from the collection cylinder 44 through the upper airfoil 52, such that air may be exhausted at or near the trailing edge of the upper airfoil 52. Additionally, a deflection shield 58 may be placed within the collection cylinder 44 proximal to an entrance to the air exhaust port and air pressure relief valve 56. The deflection shield 58 thus is able to deflect rainwater to stay within the collection cylinder 44 while allowing air to pass around the deflection shield 58 and through the air exhaust port and air pressure relief valve 56.

To hold the rain gauge in position, the rain gauge may be coupled to a support 38, e.g., a post. The rain gauge is coupled to the support 38 via a holder formed from a holder spine, a lower holder arm, and an upper holder arm. The holder spine extends between the lower holder arm and the upper holder arm. The lower holder arm includes a lower holder bearing 50 distal from the support 36, with the lower holder bearing rotatably coupling to the collection cylinder 44 proximal to the closed cylinder end and below the lower airfoil 54. The upper holder arm includes an upper holder bearing 48 distal from the support 36, with the upper holder bearing 48 rotatably coupling to the collection cylinder 44 between the upper airfoil 52 and the lower airfoil 54. The collection cylinder 44 and rain gauge head 40 are thus able to freely rotate to catch rainwater through full 360 degrees about the cylinder axis.

It should be understood, of course, that the foregoing relates to exemplary embodiments of the invention and that modifications may be made without departing from the spirit and scope of the invention as set forth in the following claims. For example, it is envisaged that the measurements could be taken using electronic measurement devices instead of indicia marks on the collection cylinder.

What is claimed is:

1. A rain gauge comprising:
a collection cylinder extending along a substantially vertical cylinder axis, and having an open cylinder end and a closed cylinder end;
a rain gauge head extending along a substantially horizontal head axis;
the rain gauge head having an intake opening at a first head end, a vane tail at an opposing second head end, and a rainwater discharge at a middle head portion, with the intake opening and vane tail being distal from the rainwater discharge; and
wherein the rainwater discharge is rotatably coupled to the open cylinder end, such that the rain gauge head rotates about the cylinder axis, wherein the rain gauge head further includes an air exhaust port and air pressure relief valve.

2. The rain gauge of claim 1, wherein the rainwater discharge includes at least one bearing rotatably coupling the rainwater discharge and the open cylinder end.

3. The rain gauge of claim 1, wherein the rain gauge head includes a deflection shield proximal to the air exhaust port and air pressure relief valve, with the deflection shield configured to allow wind to pass through the air exhaust port and air pressure relieve valve while deflecting rainwater away from the air exhaust port and air pressure relief valve and towards the rainwater discharge.

4. The rain gauge of claim 1, wherein collection cylinder attaches to a holder comprising a holder base and at least one holder ring, wherein the holder base holds the closed cylinder end and the at least one holder ring holds a middle cylinder portion of the collection cylinder, with the holder base and at least one holder ring are coupled to a holder spine.

5. A rain gauge comprising:
a collection cylinder extending along a substantially vertical cylinder axis, and having an open cylinder end and a closed cylinder end;
a rain gauge head extending along a substantially horizontal head axis;
the rain gauge head having an intake opening at a first head end, a vane tail at an opposing second head end, and a rainwater discharge at a middle head portion, with the intake opening and vane tail being distal from the rainwater discharge;
wherein the rainwater discharge is coupled to the open cylinder end; and the collection cylinder is rotatably coupled to a rain gauge holder, such that the collection cylinder and rain gauge head rotate about the cylinder axis, wherein the rain gauge holder includes at least one upper holder and at least one lower holder, with the at least one upper holder including an upper holder bearing rotatably coupled to a middle portion of the collection cylinder and the at least one lower holder including a lower holder bearing rotatably coupled to the collection cylinder proximal to the closed cylinder end.

6. The rain gauge of claim 5, wherein the collection cylinder includes at least one airfoil extending in a same direction as the vane tail.

7. The rain gauge of claim 6, wherein the at least one airfoil includes an air exhaust port and air pressure relief valve, the air exhaust port and air pressure relief valve extending through the at least one airfoil and into the collection cylinder.

8. The rain gauge of claim 7, wherein the collection cylinder includes a deflection shield proximal to the air exhaust port and air pressure relief valve, with the deflection shield configured to allow wind to pass through the air exhaust port and air pressure relieve valve while deflecting rainwater away from the air exhaust port and air pressure relief valve.

* * * * *